Jan. 5, 1943.    G. R. LUM    2,307,226
TELEPHONE CALLING DIAL DEVICE
Filed Feb. 4, 1942    2 Sheets-Sheet 1
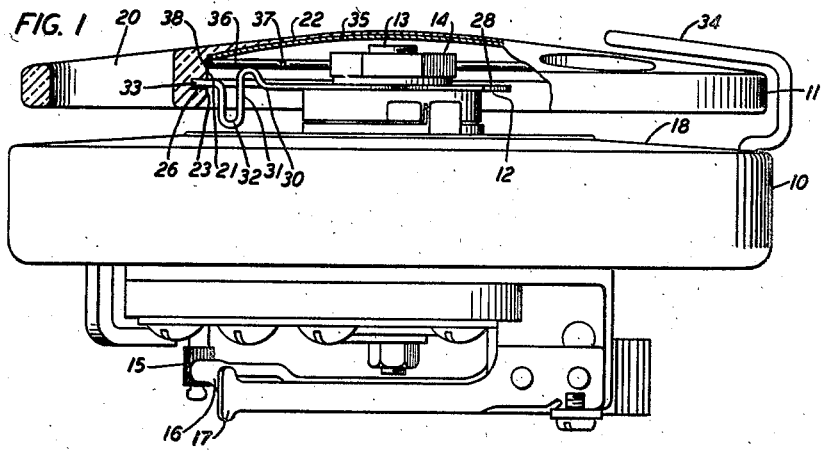
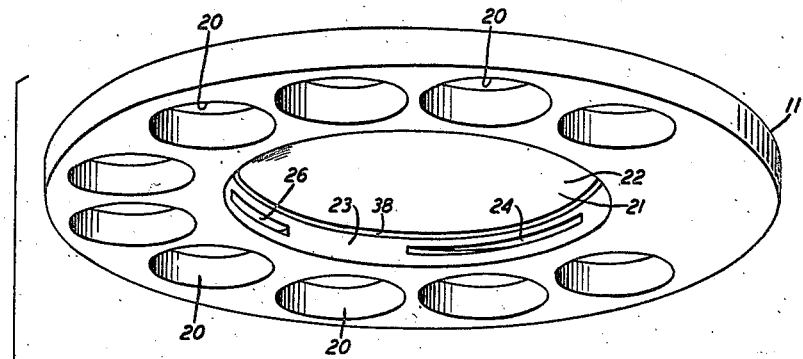
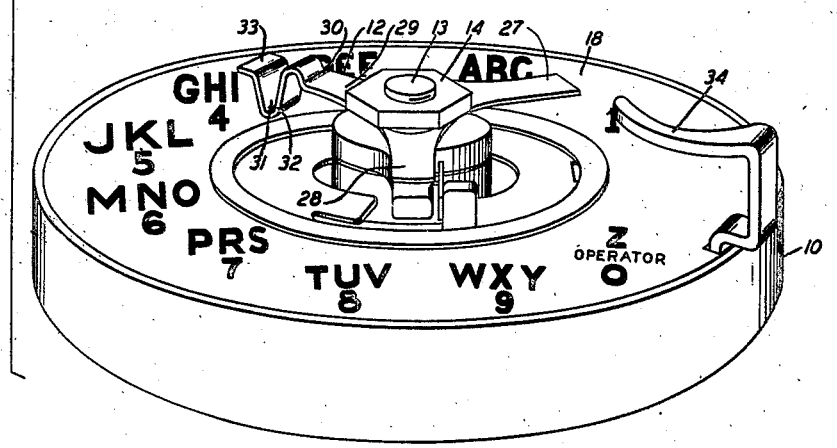
INVENTOR
G. R. LUM
BY J. MacDonald
ATTORNEY Jan. 5, 1943.    G. R. LUM    2,307,226
TELEPHONE CALLING DIAL DEVICE
Filed Feb. 4, 1942    2 Sheets—Sheet 2
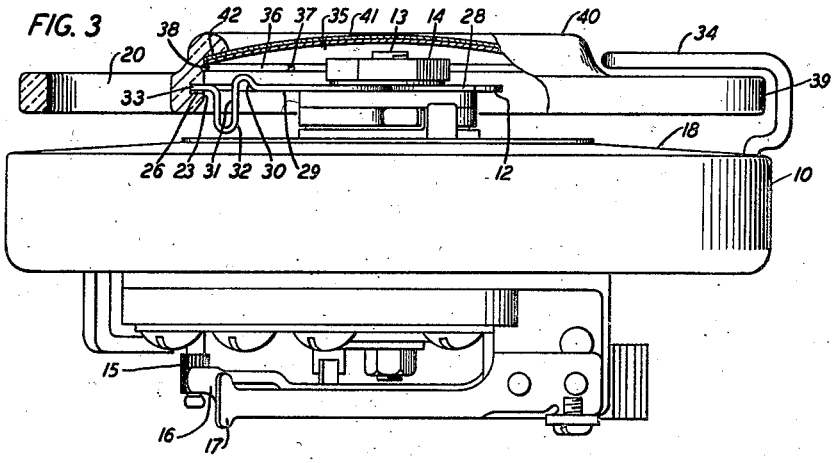
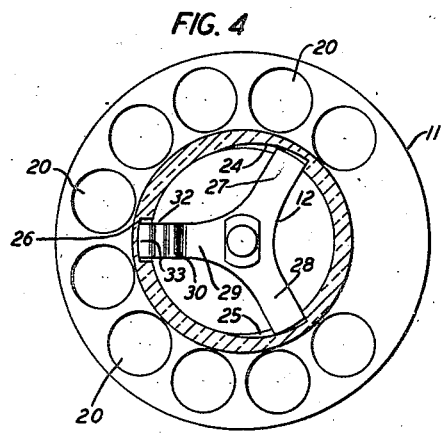
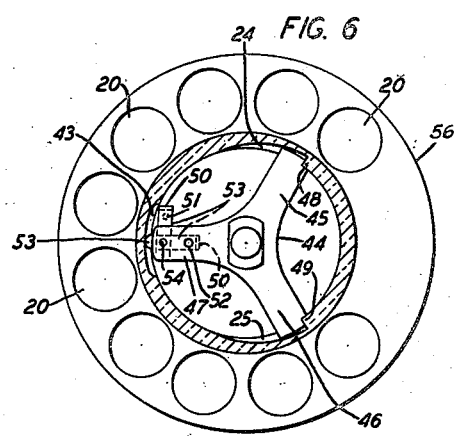
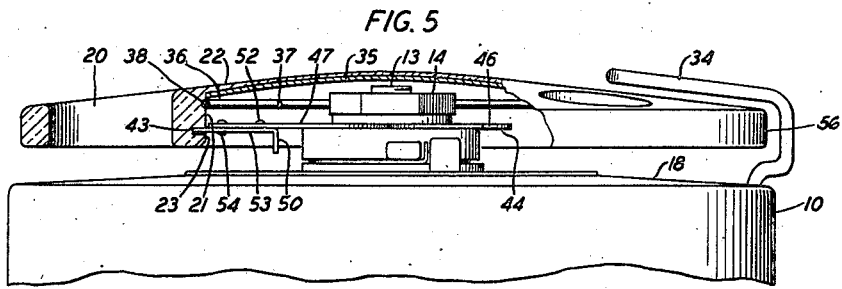
INVENTOR
G. R. LUM
BY J. MacDonald
ATTORNEY Patented Jan. 5, 1943

2,307,226

UNITED STATES PATENT OFFICE 2,307,226

TELEPHONE CALLING DIAL DEVICE

George R. Lum, New York, N. Y., assignor to Bell Telephone Laboratories, Incorporated, New York, N. Y., a corporation of New York Application February 4, 1942, Serial No. 429,511

8 Claims. (Cl. 179—90)

This invention relates to telephone calling dial devices and more particularly to telephone calling dial devices in which a finger wheel is provided to facilitate manual operation of the device.

An object of the invention is to provide a suitable structure and arrangement for flexibly supporting the finger wheel and which permits ready removal or replacement of the finger wheel.

A feature of the invention resides in a flexible support for the finger wheel.

Another feature resides in the finger wheel structure.

In the drawings:

Fig. 1 is a side elevational view partly in section of the telephone calling dial device embodying the invention;

Fig. 2 shows, in exploded arrangement, the dial device and the finger wheel;

Fig. 3 corresponds to Fig. 1 but shows a modification of the finger wheel;

Fig. 4 is a top plan view of the finger wheel and the flexible support but is drawn in reduced scale relative to Figs. 1, 2 and 3;

Fig. 5 is a side elevational view, partly in section, of a portion of a calling dial device and shows a modification of the flexible support for the finger wheel; and Fig. 6 corresponds to Fig. 4 with the exception that the flexible support is constructed like the one shown in Fig. 5.

It is common practice to make finger wheels for telephone calling devices of metal and to directly mount the finger wheel on the rotatable shaft of the device, the finger wheel being held in place by means of a nut, screw-threaded, on the shaft.

It is also common practice to have an apertured and integral hub portion on the finger wheel and to mount in the hub portion a card and a transparent cover for the card, the card having the telephone substation name and number thereon, and the card and cover being removable through the top of the hub portion to permit replacement of the card and cover and permit access to the nut on the rotatable shaft.

The trend is now, however, to make the finger wheel of molded plastic material to enhance the appearance of the calling device and reduce the cost. In some cases it is found desirable and advantageous to make the finger wheel of transparent material in order that light may pass through the finger wheel to letter and number characters on the device and located beneath the finger wheel.

Finger wheels of molded plastic material are not as strong as metal finger wheels and may become fractured in service if they are directly attached at their centers to the calling device and if undue pressures are applied to them. It is, therefore, found advantageous to provide a flexible support for the molded plastic finger wheel.

In this invention a flexible support is provided for the finger wheel. The flexible support is mounted on the rotatable shaft of the calling device and the finger wheel is mounted on the flexible support. The finger wheel may be applied to the flexible support without requiring any access through the top of the finger wheel. The finger wheel is formed and arranged so that the substation name and number card is inserted only from the under surface of the finger wheel.

In one embodiment of the invention, an integral window is provided in the finger wheel to protect the substation number card.

The telephone calling dial device as shown in Figs. 1 and 2 comprises a casing 10 and a finger wheel 11, the finger wheel 11 being supported above the casing 10. The finger wheel 11 is supported by a flexible spider type support 12, the structure of which will be subsequently described. The support 12 is supported on a rotatable operating shaft 13 and is held in place on the shaft 13 by means of a nut 14. The shaft 13 extends downward through the casing 10 and may be manually operated by means of the finger wheel 11 to wind up a spring (not shown) but which is well known in the art as part of a spring motor which serves to return the finger wheel to normal starting position and as a driving means for a contact controlling device 15 which operates spring contacts 16 and 17 to control the sending of signal pulses over a line system to obtain a desired telephone call connection.

A ring-shaped dial 18 bearing groups of letters and numerals on its upper face is supported in the top of the casing 10, the groups being arranged in positions to be separately observed through finger holes 20 provided in the finger wheel 11, all of which is well known and understood in the art.

The finger wheel 11 may be made of material suitable for molding to required form in a die and may be made, for instance, of a synthetic resin, the finger wheel 11 being provided with the usual finger holes 20 to facilitate manual rotation of the finger wheel in dialing a telephone call. The central portion of the finger wheel 11 is hollowed out from the under surface to provide a circular indentation 21 of sufficient size to accommodate the flexible support 12 and to leave across the top of the central portion a window 22 which is an integral part of the finger wheel 11. The indentation 21 is defined by the circular side wall 23 and the under surface of the window 22. The side wall 23 of the indentation 21 is recessed at spaced points to provide the recesses 24, 25 and 26 to receive respectively the outer end portions of the arms 27, 28 and 29 of the flexible spider type support 12. The recesses 24 and 25 are much longer than the recess 26 and are of gradually increasing depth as shown in Fig. 4, the depth increasing in the recess 24 in a clockwise direction and in the recess 25 in a counterclockwise direction. The recess 26 is of substantially even depth throughout and the length is only slightly more than the width of one of the arms of the spider type support 12.

The spider type support 12 is made of material in which a spring pressure may be developed and is centrally apertured to receive the upper portion of the shaft 13. Flat sides may be provided on the upper portion of the shaft 13 and the aperture in the spider type support 12 may be suitably formed to receive the shaft and so that there will be no relative turning of the support 12 on the shaft 13. The spider type support 12 is shown as having three arms but may have a greater number if desired, the finger wheel in that case having additional recesses to receive the arms of the spider type support. The arms 27 and 28 extend into the respective recesses 24 and 25 and in normal position extend into the deeper ends of the recesses. The arm 29 is bent upwardly at 30 above the plane of the main portion of the spider type support 12 and then downwardly to extend below the normal plane and upwardly again to the normal plane and outwardly in the normal plane to provide a spring portion 31 comprising the series of bends indicated and a downwardly extending U-shaped portion 32 which extends below the lower surface of the finger wheel 11. The outer end 33 of the spring portion 31 normally extends into the recess 26 but may be withdrawn therefrom by suitably compressing the U-shaped portion 32.

The finger wheel 11 may be readily applied to and mounted on the spider type support 12 by simply placing the ends of the arms 27 and 28 in the respective recesses 24 and 25 in the finger wheel 11, moving the finger wheel 11 toward the left so that the arms 27 and 28 extend into the deeper ends of the recesses 24 and 25, and then by snapping the arm 29 into the recess 26. The arm 29 may be snapped into place by applying a screwdriver or other suitable tool against the outer leg of the U-shaped portion 32 and applying pressure toward the shaft 13 until the arm 29 is in effect shortened to a sufficient extent to pass the lower edge of the wall 23. The finger wheel 11 may then be pressed downwardly to bring the recess 26 in line with the end portion 33 of the arm 29. Release of the pressure on the U-shaped portion 32 of the arm 29 will result in extension of the arm 29 into the recess 26 under the action of the spring pressure developed in the U-shaped portion 32.

To remove the finger wheel 11 from the spider type support 12 it is only necessary to, in effect, shorten the arm 29 until the end portion 33 is withdrawn from the recess 26 and then tilt and move the finger wheel 11 so that the arms 27 and 28 are free of the recesses 24 and 25. The arm 29 may be, in effect, shortened by applying sufficient pressure by means of a suitable tool to the left side of the U-shaped portion 32 and toward the shaft 13.

When the finger wheel 11 is mounted on the flexible spider type support 12 and is turned in a clockwise direction, the end wall at the deeper end of the recess 25 transmits the rotational movement of the finger wheel 11 to the flexible spider type support 12. In the return movement of the flexible spider type support 12, the arm 28 bearing against the wall at the deeper end of the recess 25 applies a corresponding movement to the finger wheel 11. Since the recess 24 is deepened in a clockwise direction and the recess 25 is deepened in a counterclockwise direction and the wall at the deeper end of each recess forms a stop, the finger wheel 11 cannot be rotated relative to the flexible spider type support 12 in either direction when the finger wheel 11 is mounted on the flexible spider type support 12, even though there might be some clearance between the edges of the arm 29 and the end walls of the recess 26. The calling device is provided with the usual finger stop 34.

The window 22, shown in Fig. 1, serves as a protection for the substation name and number card 35 which is applied against the under surface of the window 22 and held in place by means of a spring ring 36. The spring ring 36 is an incomplete ring as shown at 37 and is placed against the under edge of the card 35 and is snapped into an annular groove 38 formed in the wall 23 of the indentation 21.

In Fig. 3 the finger wheel 39 has an apertured hub portion 40 and does not have the integral window 22 shown in Fig. 1. The substation name and number card 35 is covered by a transparent disc 41, the disc 41 and the card 35 being placed beneath an overhang 42 in the hub portion 40. The finger wheel 39 is otherwise formed along the same general lines as the finger wheel 11 in Fig. 1 and is supported in the same manner by the flexible spider type support 12.

In the modification shown in Figs. 5 and 6, the finger wheel 56 is constructed along the same general lines as the finger wheel 11 in Fig. 1, the only difference is that in the finger wheel 56, a comparatively long recess 43 is provided in place of the recess 26. The finger wheel 56 is supported on a flexible spider type support 44 comprising the arms 45, 46 and 47. The arms 45 and 46 are corner notched at 48 and 49, respectively, to fit into the respective recesses 24 and 25 and to bear against the corners of the walls at the deeper ends of the recesses 24 and 25. The arm 47 is equipped with a pivotally supported finger 53 which may be swung on its supporting bolt or pin 54 to extend into the recess 43. The finger 53 is provided with an operating handle portion 50 to facilitate movement of the finger, and detent means are provided in the parts to hold the finger 53 extended into the recess 43. The detent means as shown in Figs. 5 and 6 may be an embossing 51 on the finger 53 and a corresponding indentation, the back of which is shown at 52 in the arm 47. The flexible spider type support 44 is apertured to receive the shaft 13 and is retained on the shaft 13 by means of the nut 14.

When the arms 45 and 46 are in the recesses 24 and 25, respectively, and the finger 53 is extended into the recess 43 and so that the detent means holds the finger 53 in that position, the finger wheel 56 is operatively mounted on the flexible spider type support 44. To release the finger wheel 56 from the flexible spider type support 44, it is only necessary to swing the finger 53 out of the recess 43 and move the finger wheel 56 relative to the flexible spider type support 44 so that the arms 45 and 46 are withdrawn from the respective recesses 24 and 25. The finger 53 may be manipulated by thrusting a screwdriver or other suitable tool against the handle 50 and rotating the finger 53 on its pivotal point of support 54.

What is claimed is:

1. In a telephone calling dial device comprising a rotatable shaft and means controlled by operation of said shaft to control the sending of signal pulses, in combination, a finger wheel, spaced recesses formed in said finger wheel, a spider type support of flexible material mounted on said shaft, arm members on said spider type support extending into said recesses and an extendible arm member on said spider type support extending into one of said recesses, and holding said arms in said recesses so that said finger wheel cannot be accidentally removed from said spider type support.

2. In a telephone calling dial device comprising a rotatable shaft and means controlled by operation of said shaft to control the sending of signal pulses, in combination, a finger wheel, spaced recesses formed in said finger wheel, a spider type support of flexible material mounted on said shaft, arm members on said spider type support extending into said recesses and extendible means on at least one of said arm members and extending into one of said recesses to hold said finger wheel and said spider type support in operative condition.

3. In a telephone calling dial device comprising a rotatable shaft and means controlled by operation of said shaft to control the sending of signal pulses, in combination, a finger wheel, spaced recesses formed in said finger wheel, a spider type support of flexible material mounted at its center on said shaft, arms on said spider type support and extending into said recesses and a series of bends formed in at least one of said arms to provide a compressible spring portion thereon to normally maintain the outer ends of said arms in said recesses.

4. In a telephone calling dial device comprising a rotatable shaft and means controlled by operation of said shaft to control the sending of signal pulses, in combination, a finger wheel, a wall in the central portion of said finger wheel, spaced recesses formed in said wall and opening toward the center of said finger wheel, a spider type support of flexible material mounted on said shaft, arms on said spider type support extending into said recesses and a folded spring portion formed on at least one of said arms to normally hold said arms in said recesses.

5. In a telephone calling dial device comprising a rotatable shaft and means controlled by operation of said shaft to control the sending of signal pulses, in combination, a finger wheel, an indentation formed in the central portion of said finger wheel, a wall defining said indentation, spaced recesses of gradually increasing depth formed in said wall, said recesses being deeper at one end than the other and terminating at the deeper end in an abrupt stop, one of said recesses being deepened in a clockwise direction and another of said recesses being deepened in a counter-clockwise direction, arms on said spider type support extending into said recesses, an extendible arm on said spider type support, a recess formed in said wall to receive an end portion of said extendible arm and said extendible arm serving to hold all arms of said spider type support in the recesses formed in said wall.

6. In a telephone calling dial device comprising a rotatable shaft and means controlled by operation of said shaft for controlling the sending of signal pulses, in combination, a finger wheel, spaced recesses formed in said finger wheel and opening towards the center of said finger wheel, a spider type support of flexible material mounted at its center on said shaft, the arms of said spider type support extending into said recesses, a folded spring portion formed on at least one of said arms to normally maintain said arms in said recesses and a U-shaped extension in said folded spring portion extending below the lower surface of said finger wheel and manually operable to release the arm equipped with said folded spring portion from its corresponding recess.

7. In a telephone calling dial device comprising a rotatable shaft and means controlled by operation of said shaft for controlling the sending of signal pulses, in combination, a finger wheel, spaced recesses formed in said finger wheel and opening toward the center of said finger wheel, a spider type support of flexible material mounted at its center on said shaft, arms on said spider type support extending in line with said recesses, a manually operated finger pivotally supported on at least one of said arms and operable to be moved into the corresponding recess for that arm and so that the other arms of said spider type support will be brought into their corresponding recesses in said finger wheel and means on said spider type support and on said finger to releasably hold said finger in operated position.

8. In a telephone calling dial device comprising a rotatable shaft and means controlled by operation of said shaft to control the sending of signal pulses, in combination, a spider type support of flexible material supported on said shaft, a finger wheel of transparent material supported on the arms of said spider type support, an indentation formed in the under surface of said finger wheel to receive said spider type support, and a window integral with said finger wheel and extending over said spider type support.

GEORGE R. LUM.